c
(12) United States Patent  
Komatsu

(10) Patent No.: US 7,571,048 B2  
(45) Date of Patent: Aug. 4, 2009

(54) PROVIDING ROUTING INFORMATION BASED ON AMBIGUOUS LOCATIONS

(75) Inventor: Hiroyuki Komatsu, Tokyo (JP)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 11/465,771

(22) Filed: Aug. 18, 2006

(65) Prior Publication Data

US 2008/0082256 A1 Apr. 3, 2008

(51) Int. Cl.
*G01C 21/34* (2006.01)

(52) U.S. Cl. .................. 701/201; 340/995.22; 455/428; 455/445

(58) Field of Classification Search ........... 701/201; 340/988, 995.22, 905, 995; 455/89, 404.2, 455/428, 445, 456.1; *G01C 21/34*
See application file for complete search history.

(56) References Cited

U.S. PATENT DOCUMENTS

| 5,774,824 | A * | 6/1998 | Streit et al. ............... 701/207 |
| 6,014,090 | A * | 1/2000 | Rosen et al. .............. 340/905 |
| 6,029,069 | A * | 2/2000 | Takaki ..................... 455/456.1 |
| 6,269,306 | B1 * | 7/2001 | Ibrahim et al. ............. 701/214 |
| 6,401,035 | B2 * | 6/2002 | Jin ............................. 701/213 |
| 6,539,080 | B1 * | 3/2003 | Bruce et al. .............. 379/88.17 |
| 7,231,293 | B2 * | 6/2007 | Lapstun et al. ............. 701/202 |
| 7,389,179 | B2 * | 6/2008 | Jin et al. .................... 701/207 |
| 2002/0151327 | A1 * | 10/2002 | Levitt ........................ 455/556 |
| 2004/0030493 | A1 * | 2/2004 | Pechatnikov et al. ........ 701/208 |
| 2005/0149253 | A1 * | 7/2005 | Nambata .................... 701/201 |

OTHER PUBLICATIONS

Antonio Krüger, et al., "The Connected User Interface: Realizing a Personal Situated Navigation Service", IUI'04, Jan. 13-16, 2004, Madeira, Funchal, Portugal, 8 Pages.
PCT International Search Report and Written Opinion, PCT/US07/76206, Jun. 23, 2008, 6 Pages.

* cited by examiner

*Primary Examiner*—Tuan C To
(74) *Attorney, Agent, or Firm*—Fenwick & West LLP

(57) ABSTRACT

A routing server receives a request for routing information. The request specifies one or more locations. A specified location may be ambiguous. For an ambiguous location, the routing server identifies a set of potentially-matching locations and ranks the locations according to a metric. The routing server returns routing information for the highest-ranked location that potentially matches an ambiguous location. If a request for routing information specifies two locations, and at least one location is ambiguous, the routing server pairs combinations of potentially-matching locations based on the query and calculates a metric for each pair. In one case, the metric is the distance between the locations in the pair. The routing server ranks the pairs based on the metric, and returns routing information for the highest-ranked pair.

23 Claims, 4 Drawing Sheets

PROVIDING ROUTING INFORMATION BASED ON AMBIGUOUS LOCATIONS

BACKGROUND OF THE INVENTION

1. Field of the Invention

This invention pertains in general to computerized mapping and in particular to systems for providing directions or other routing information between specified locations.

2. Description of the Related Art

It has become commonplace to use web sites on the Internet to obtain routing information such as driving directions, train schedules, and the like. At most web sites, an end-user seeking directions provides a starting location and an ending location, and the web site returns routing information between the two locations. The site may also return additional information, such as maps and estimated travel times.

A common problem involved in calculating routing information is ambiguity of locations. Oftentimes, the end-user will provide only a partial address for one or both of the locations. Partial addresses are difficult to resolve because there are often multiple places having the same name. For example, an end-user seeking driving directions between Salem, Ind. and Chicago, Ill. might provide a web site with a routing request that identifies a starting location of "Salem" and/or an ending location of "Chicago." There are at least 10 cities in the United States with the name "Salem" and there are likewise at least two cities named "Chicago." As a result, the web site needs to ask the end-user to refine the routing request to resolve the ambiguous locations.

Typically, the web site will provide the end-user with a list of possible locations matching an ambiguous location, and ask the end-user to select from among them. For example, the web site may ask the end-user to select between Chicago, Ill. and Chicago, Wis. These interactions between the end-user and the web site are cumbersome and time-consuming. The problems are especially acute when the end-user is communicating with the web site via a slow communications link and/or utilizing a mobile device with a small display screen or limited user interface.

Accordingly, there is a need in the art for a more efficient way to resolve requests for routing information that specify an ambiguous location.

BRIEF SUMMARY OF THE INVENTION

The above need is met by a method, system, and computer program product for providing routing information that receives a request for routing information, the request specifying at least one ambiguous location. The method, system, and computer program product identify locations potentially matching the ambiguous location, and rank the potentially-matching locations based on a metric. Then, the method, system, and computer program product provide routing information for the highest-ranked potentially-matching location.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
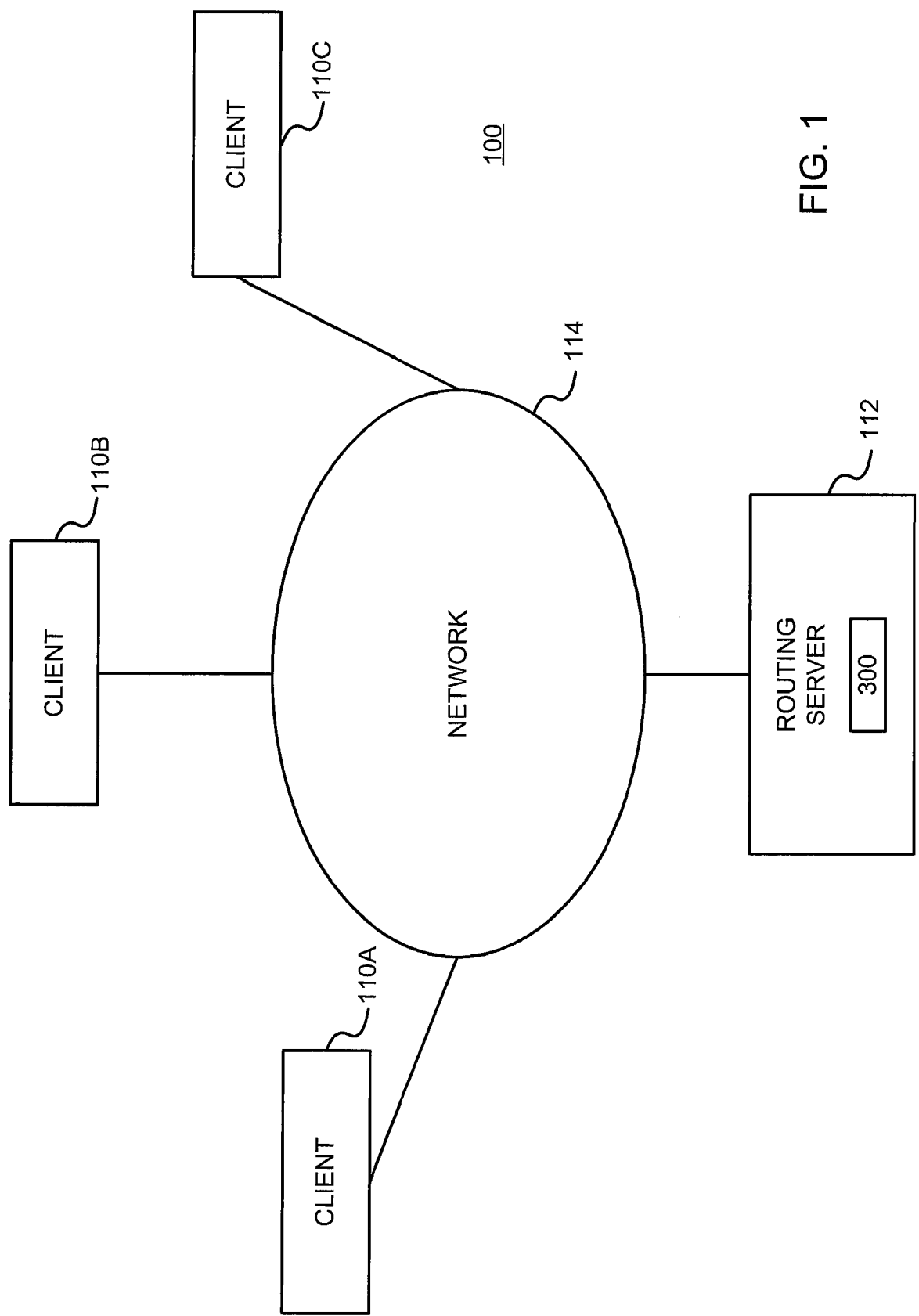
FIG. 1 is a high-level block diagram of a computing environment according to one embodiment of the present invention.

FIG. 1 is a high-level block diagram of a computing environment 100 according to one embodiment of the present invention. FIG. 1 illustrates three clients 110 and a routing server 112 connected by a network 114. FIG. 1 and the other figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110A," "110B," and/or "110C" in the figures). Although FIG. 1 illustrates only three clients 110, embodiments of the present invention can have thousands or millions of clients interacting with the server 112. Only three clients 110 are illustrated in order to simplify and clarify the present description. Likewise, other servers that might be connected to the network 114 are not shown in FIG. 1.

The client 110 represents a device utilized by an end-user to interact with the server 112 via the network 114 in order to provide routing requests and obtain routing information in response. In one embodiment, the client 110 is a computer having standard networking functionality. In some embodiments, the client 110 is a mobile device such as a notebook computer, a mobile telephone, a personal digital assistant (PDA), a portable email device, a handheld game device, an automobile navigation system, or another type of device with equivalent functionality. The client 110 communicates with the server 112 using standard networking technologies, including wired and/or wireless network links using computer and/or mobile telephone communications protocols.

The client 110 includes functionality for submitting routing requests to the server 112, and for providing the received routing information to the end-user. In some embodiments, the client 110 includes a keyboard for inputting the requests, and a display device for viewing the routing information. Many mobile phones and other mobile devices have small keyboards that are difficult to use. In other embodiments, the client 110 includes additional and/or different functionality for performing these tasks, such as a touch screen-based input device and/or an audio output device.

In one embodiment, the client 110 includes web-browsing functionality that allows it to use standard Internet communications technologies to exchange messages with the server 112. For example, the client 110 can execute a web browser such as MICROSOFT INTERNET EXPLORER®, a browser optimized for mobile devices such as OPERA MOBILE™ and OPERA MINI™, and/or another browser that allows the end-user to retrieve and display content from web servers and other computer systems on the network 114.

The routing server 112 receives routing requests from the clients 110 and provides routing information in return. In one embodiment, the routing server 112 includes a computer acting as a web server that is utilized to provide web pages to the clients 110 and receive data submitted by the clients in response. The routing server 112 includes a routing information module 300 for receiving the routing requests and generating the routing information.

Oftentimes, the routing requests received from the clients 110 include starting and ending locations, and the routing server 112 generates routing information that explains how to travel from the starting location to the ending location. The routing information can include, for example, driving directions and maps, train schedules and directions, plane schedules, etc. While this description frequently refers to routing requests having two locations, it will be understood that the routing server 112 can respond to requests having any number of locations. For example, the routing server 112 can provide routing information for a single location that describes schedules for buses, trains, and/or planes that transit the location. Likewise, the routing server 112 can provide routing information for three or more locations that describes a route passing through all of the locations.

In one embodiment, the routing server 112 resolves ambiguous locations (e.g., place names like "Salem" and "Chicago") by computing the distances between pairs of potentially-matching locations, and returning routing information for the closest pair of locations (i.e., the locations having the least distance between them). Thus, an embodiment of the routing server 112 that receives a request for driving directions between "Salem" and "Chicago" will automatically provide driving directions between Salem, Ind. and Chicago, Ill. because these two locations are closer together than any other two cities having those names. In addition, the routing server 112 provides a user interface (UI) allowing the end-user to specify a different pair of locations if the pair selected by the routing server 112 is not what the end-user intended.

The network 114 represents the communication pathways between the clients and the routing server 112. In one embodiment, the network 114 is the Internet. The network 114 can also utilize dedicated or private communications links that are not necessarily part of the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc., as well as links using mobile telephone communications technologies. Similarly, the networking protocols used on the network 114 can include multiprotocol label switching (MPLS), the transmission control protocol/Internet protocol (TCP/IP), the hypertext transport protocol (HTTP), the simple mail transfer protocol (SMTP), the file transfer protocol (FTP), the short message service (SMS) protocol, etc. The data exchanged over the network 114 can be represented using technologies and/or formats including the hypertext markup language (HTML), the extensible markup language (XML), the Extensible Hypertext markup Language (XHTML), the compact HTML (cHTML), etc. In addition, all or some of links can be encrypted using conventional encryption technologies such as the secure sockets layer (SSL), HTTP over SSL (HTTPS), and/or virtual private networks (VPNs). In other embodiments, the clients 110 and routing server 112 use custom and/or dedicated data communications technologies instead of, or in addition to, the ones described above.

II. System Architecture

Figure 2:
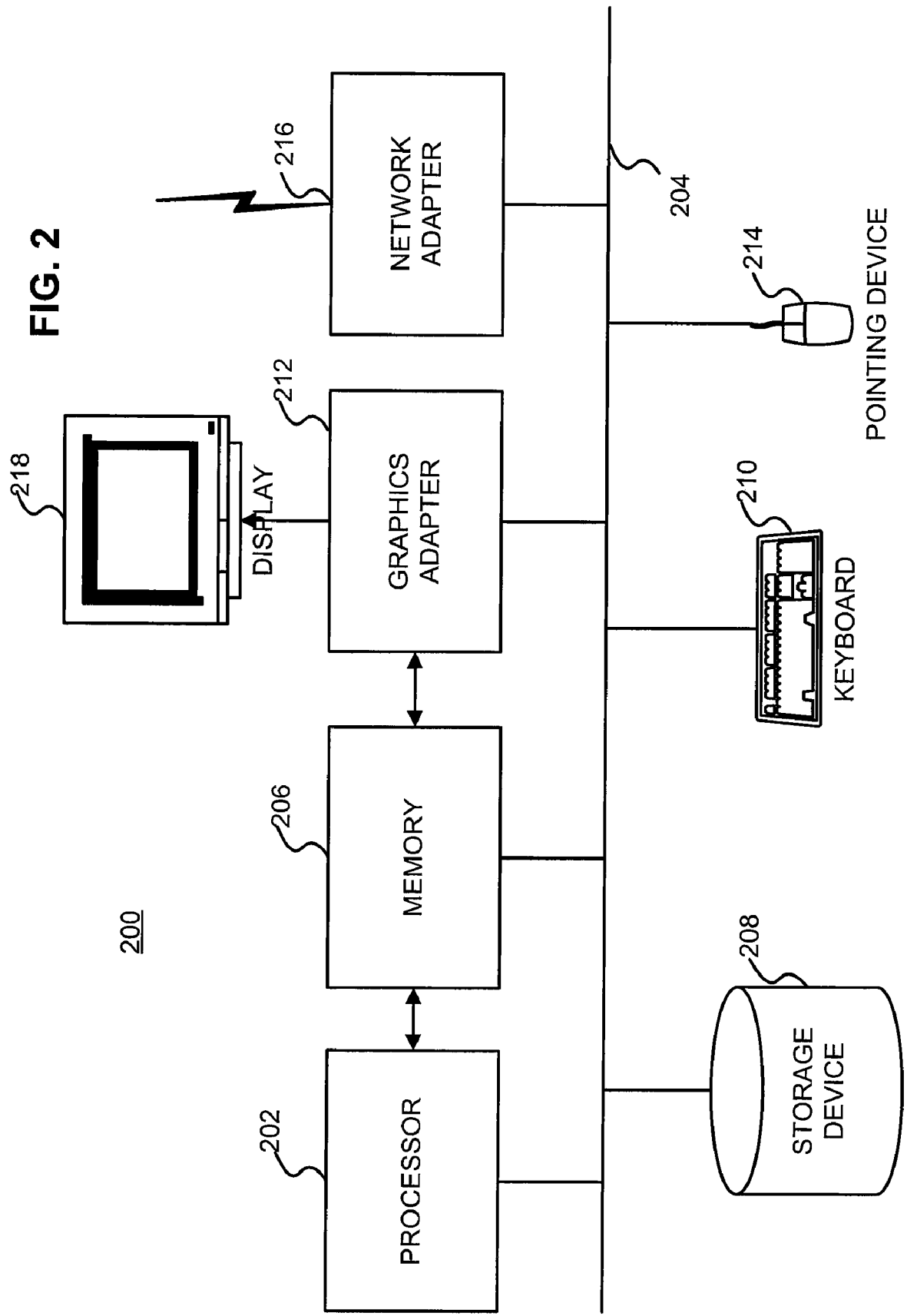
FIG. 2 is a high-level block diagram illustrating a functional view of a typical computer for use as a client or server like those illustrated in the environment of FIG. 1 according to one embodiment.

FIG. 2 is a high-level block diagram illustrating a functional view of a typical computer 200 for use as a client 110 or server 112 like those illustrated in the environment 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer 200 to the network 114.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 utilized by the entities of FIG. 1 can vary depending upon the embodiment and the processing power utilized by the entity. For example, the client 110 typically requires less processing power than the routing server 112. Thus, the client 110 can be a standard personal computer system or handheld electronic device. The routing server 112, in contrast, may comprise more powerful computers and/or multiple computers working together to provide the functionality described here. Likewise, the computers 200 can lack some of the components described above. For example, a mobile phone acting as a client 110 may lack a pointing device, and a computer acting as the routing server 112 may lack a keyboard and display.

Figure 3:
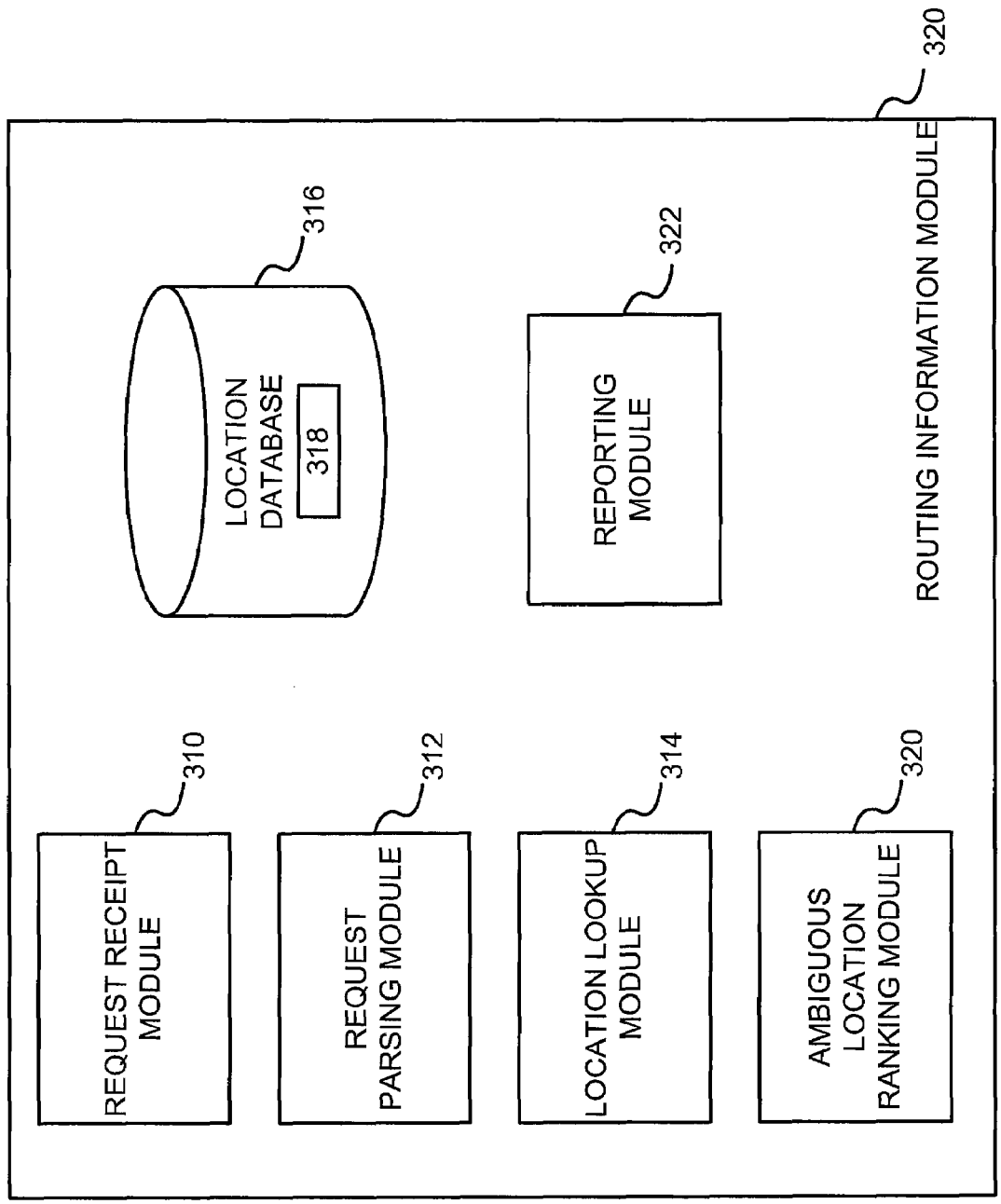
FIG. 3 is a high-level block diagram illustrating modules within the routing information module according to one embodiment.

FIG. 3 is a high-level block diagram illustrating modules within the routing information module 300 according to one embodiment. Other embodiments have different and/or additional modules than the ones shown in FIG. 3. Moreover, other embodiments distribute the functionalities among the modules in a different manner.

A request receipt module 310 receives the routing request from the client 110 and/or another source. In one embodiment, the routing request specifies two or more locations between which routing information is requested. In addition, the routing request may include other data, such as parameters describing the types of routing information requested (e.g., driving directions or train schedules), the time/date for which routing information is requested, whether to use highways, express trains, or planes for the routes, etc.

A request parsing module 312 parses the routing request and extracts the specified locations. A location is typically specified by a name and/or address, and can also be specified by other means, such as geographic coordinates. In one embodiment, the locations are explicitly identified by the routing request. For example, a web page that the routing server 112 provides to the clients 110 can have forms that segregate the origin and destination information into names, street addresses, cities, states/provinces/prefectures, and mailing codes. In another embodiment, some or all of the locations are implicitly identified. For example, the routing request can be included in a freeform text string such as "driving directions between Tokyo and Kamakura." Upon receipt of the free form request, the request parsing module 312 parses the query utilizing regular expressions and/or other techniques to extract information about the locations referenced therein.

Sometimes, a parsed location will be specified using imprecise and/or incomplete information. This lack of information can occur because the end-user did not provide the information in the request, and/or because of parsing difficulties. For example, the routing request can specify a location with a street address and city name, but lack the name of the state or prefecture in which the city is located. Similarly, the request can specify a location with a name (e.g., "Ebisu Station") but lack the name of the city where the station is located.

A location lookup module 314 looks up the locations extracted from the routing request in a location database 316. In one embodiment, the location database 316 includes information describing possible locations that may be specified by routing requests. Further, the location database 316 includes data describing routes between the locations. For example, the location database 316 can include data describing street maps for one or more countries. In addition, the location database can include data describing trains, planes, buses, ferries, and other transit lines. In addition, an embodiment of the location database 316 includes related information, such as real-time or historical street traffic information, transit schedules and fee tables, etc. In one embodiment, the location database 316 is comprised of multiple separate databases. One or more of the separate databases can be external to the routing server 112.

In one embodiment, the location database 316 includes a metrics module 318 holding data allowing rankings and/or comparisons of locations in the database. In one embodiment, a metric is distance and the metrics module 318 holds data describing the geographic positions of the locations in the database. Further, the metrics module 318 (or another module) calculates the distance between two or more specified locations. In one embodiment, the metrics module 318 geocodes locations in the location database 316 into latitude/longitude coordinates and then computes the distance between the coordinates. In another embodiment, a metric is population and/or surface area and the metrics module 318 holds data describing populations and surface areas of various locations and/or regions (e.g., cities) identified in the location database 318. In yet another embodiment, a metric is popularity and the metrics module 318 holds data describing popularities of the various locations in the locations database 316. The popularities are based on the frequency that the locations appear in routing requests, end-user rankings, volume of traffic passing through the location (e.g., number of passengers transiting a train station) and/or other criteria.

The location lookup module 314 accesses the location database 314 in order to obtain routing information between the locations parsed from the request. Depending upon the request, the specified locations may be ambiguous, unambiguous, or unknown. An ambiguous location is one where the location lookup module 314 identifies two or more possible matches in the location database 316. For example, if the routing request identifies a location as "Chicago," the location is ambiguous because it is unclear whether the request refers to Chicago, Ill. or Chicago, Wis. In another example, if the routing request identifies a location as "Ebisu Station," it is ambiguous because it is not clear whether the location refers to the Ebisu Station in Tokyo or the Ebisu Station in Hyogo. In a third example, a location can be ambiguous because the routing request contains a typographical error (e.g., "Chicagp"). The location lookup module 314 may identify a set of potential matches for the location, but might be unable to identify a single match due to the typographical error.

In contrast, an unambiguous location is one where the location lookup module 314 identifies a single matching location in the location database 316. An unknown location is one where the location lookup module 314 is unable to find any matching location in the location database 316. In one embodiment, the location lookup module 314 responds to an unknown location by rejecting the routing request and asking the end-user to provide more information.

An ambiguous location ranking module 320 ranks ambiguous locations in requests based on metrics provided by the metrics module 318. In an embodiment where the routing request specifies two locations, the ambiguous location ranking module 320 computes pairings of potentially-matching locations in the request and utilizes the metrics from the metrics module 318 to rank them. For example, assume that the routing request unambiguously specifies the starting location as Salem, Ind. and ambiguously identifies the ending location as "Chicago." The ambiguous location ranking module 320 computes the potentially-matching pairings of locations as follows:

| Start | End |
|---|---|
| Salem, IN | Chicago, IL |
| Salem, IN | Chicago, WI |

Given these pairings, the ambiguous location ranking module 320 utilizes one or more metrics from the metrics module 318 to rank them. For example, assume that the metric is distance and the distance between the locations is as follows:

| Start | End | Distance |
|---|---|---|
| Salem, IN | Chicago, IL | 329 miles |
| Salem, IN | Chicago, WI | 347.5 miles |

Based on distance, the ambiguous location ranking module 320 ranks the "Salem, Ind./Chicago, Ill." pairing first, and the "Salem, Ind./Chicago, Wis." pairing second. Rankings based on other metrics, such as population and popularity, are likely to produce the same results because Chicago, Ill. is a much larger city than Chicago, Wis.

A reporting module 322 reports the requested routing information. In the case where the routing request does not have any ambiguous locations, an embodiment of the reporting module 322 provides only the requested routing information. For example, the routing information can comprise driving directions, train directions and schedules, etc. In the case where the routing request contains at least one ambiguous location, an embodiment of the reporting module 322 provides routing information for the top ranked pair of locations, and provides a UI allowing the end-user to select a different pair of locations if desired. Thus, in the Salem/Chicago example described above, the reporting module 322 provides routing information from Salem, Ind. to Chicago, Ill., and provides a UI allowing the end-user to select routing information for Salem, Ind. to Chicago, Wis. if desired.

Figure 4:
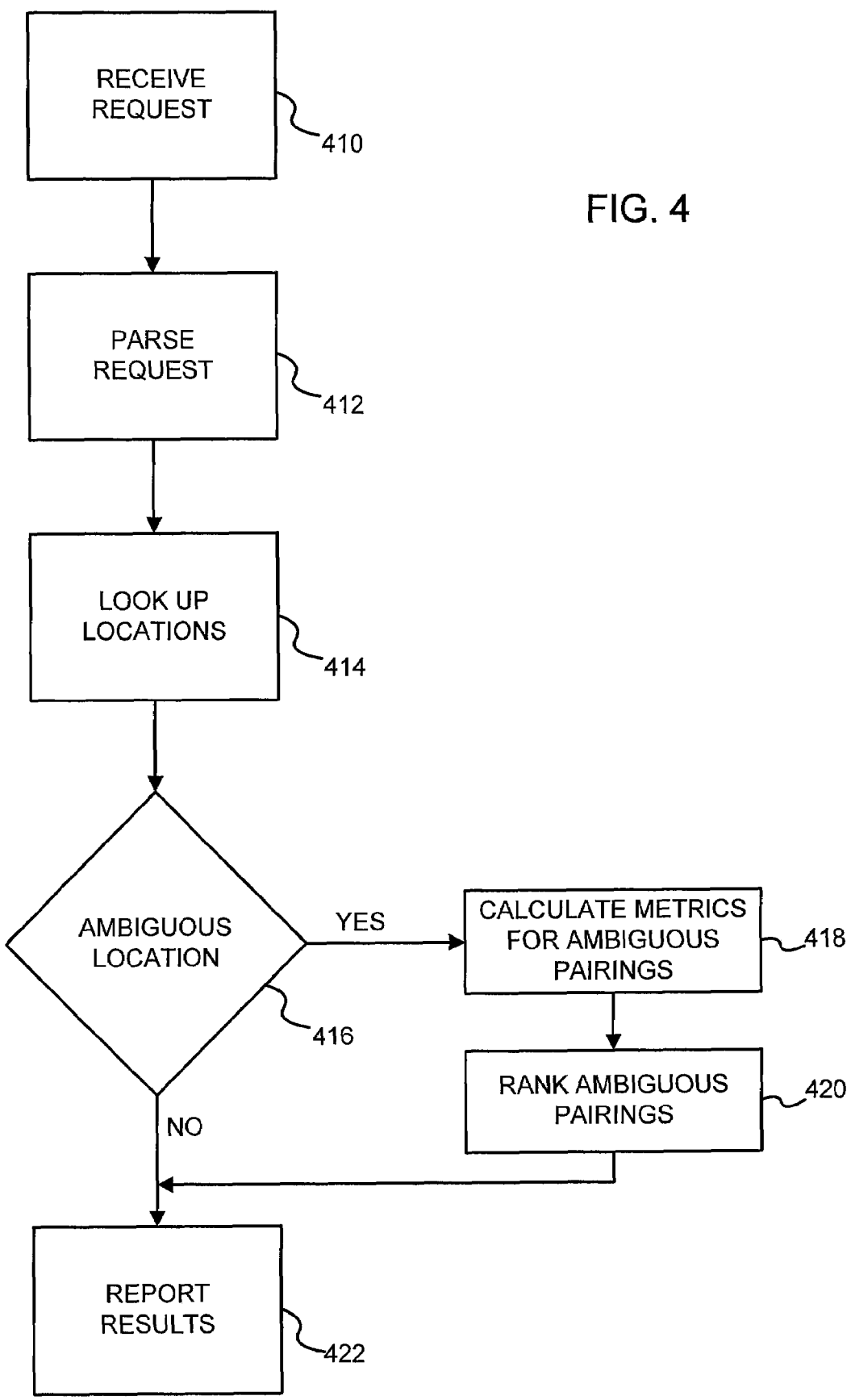
FIG. 4 is a flowchart illustrating steps performed by the routing information module and/or the routing server according to one embodiment.

FIG. 4 is a flowchart illustrating steps performed by the routing information module 300 and/or the routing server 112 according to one embodiment. Other embodiments perform additional and/or different steps that the ones described in the figure. In addition, other embodiments perform the steps in different orders. In one embodiment, the routing information module 300 simultaneously serves thousands or millions of routing requests, and thus performs many instances of the steps concurrently.

Initially, the routing information module 300 receives 410 a routing request from a client 110 or another source. For example, the routing server 112 or another server provides the client 110 with a web page that allows an end-user of the client to generate a routing request and submit it to the routing server. The routing information module 300 parses 412 the request to extract the locations specified within it.

The routing information module 300 looks up 414 the parsed locations in the location database 316 to find potential matches. A location that has only a single match is unambiguously identified. A location with two or more matches is ambiguously identified. A location that has zero matches is unrecognized, and one embodiment of the routing information module 300 terminates processing of the routing request until the requestor provides more information (this action is not shown in FIG. 4).

If 416 there is at least one ambiguous location, the routing information module 300 generates pairings of potentially-matching locations. The routing information module 300 calculates 418 a metric for each pair. In one embodiment, the metric is the distance between the locations in the pair. In other embodiment, the metric is based on one or more other factors, such as population or popularity.

The routing information module 300 ranks 420 the pairings of potentially-matching locations based on the calculated metrics. For example, if the metric is distance, the routing information module 300 ranks the pairings in an order based on the distance between the locations in each pair. The routing information module 300 then reports 422 the results. The highest-ranked pairing (e.g., the pairing having the least distance between locations) is treated as the end-user's intended routing request, and the routing information module 300 provides the routing information for this pair as part of the report. In addition, the routing information module 300 provides a UI listing the other potentially-matching pairings (or at least the top-ranked pairings) and enabling the end-user to select a different pair if desired.

The routing information module 300 thus provides routing information for the locations probably intended by the end-user, even if the locations specified in the request are ambiguous. If the routing information module 300 provides routing information for an incorrect location, a pair of locations including the correct one is likely to be listed in the UI so that it can be easily selected by the end-user. This technique minimizes the end-user's interactions with the routing server 112 and reduces the hassle of using a cumbersome input device such as a small keyboard of a mobile phone to request routing information.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of providing routing information, comprising:
    receiving, by a computer, a request for routing information, the request specifying at least one ambiguous location;
    identifying, by a computer, locations potentially matching the ambiguous location;
    ranking, by a computer, the potentially-matching locations based on a metric; and
    providing, by a computer, routing information for the highest-ranked potentially-matching location.

2. The method of claim 1, wherein the metric is distance, and wherein the ranking comprises:
    calculating a distance between each location potentially matching the ambiguous location and an other location; and
    ranking the potentially-matching locations based on the distances from the potentially-matching locations to the other location.

3. The method of claim 2, wherein the highest-ranked potentially-matching location has the shortest distance to the other location.

4. The method of claim 1, wherein the metric is populations of the potentially-matching locations.

5. The method of claim 1, wherein the metric is frequencies that the potentially-matching locations appear in routing requests.

6. The method of claim 1, wherein the ranking comprises:
    generating pairings of locations based on locations specified in the request, each pairing including at least one location potentially matching the ambiguous location;
    calculating distances between the locations in the pairs; and
    ranking the pairings based on the calculated distances.

7. The method of claim 1, wherein the routing information comprises one or more types of information from the set consisting of:
    driving directions, train schedules, bus schedules, and flight schedules.

8. The method of claim 1, wherein the ambiguous location is a starting or ending location of a route for which routing information is requested.

9. A system for providing routing information, comprising:
    a computer-readable storage medium storing executable computer program modules comprising:
        a request receipt module for receiving a request for routing information, the request specifying at least one ambiguous location;
        a location lookup module for identifying locations potentially matching the ambiguous location;
        an ambiguous location ranking module for ranking the potentially-matching locations based on a metric; and
        a reporting module for providing routing information for the highest-ranked potentially-matching location; and
    a processor for executing the computer program modules.

10. The system of claim 9, wherein the metric is distance, and wherein the ambiguous location ranking module is further adapted to:
    calculate a distance between each location potentially matching the ambiguous location and an other location; and
    rank the potentially-matching locations based on the distances from the potentially-matching locations to the other location.

11. The system of claim 10, wherein the highest-ranked potentially-matching location has the shortest distance to the other location.

12. The system of claim 9, wherein the metric is populations of the potentially-matching locations.

13. The system of claim 9, wherein the metric is frequencies that the potentially-matching locations appear in routing requests.

14. The system of claim 9, wherein the ambiguous location ranking module is further adapted to:
generate pairings of locations based on locations specified in the request, each pairing including at least one location potentially matching the ambiguous location;
calculate distances between the locations in the pairs; and
rank the pairings based on the calculated distance.

15. The system of claim 9, wherein the routing information comprises one or more types of information from the set consisting of:
driving directions, train schedules, bus schedules, and flight schedules.

16. A computer program product having a computer-readable storage medium having executable computer program code tangibly embodied therein for providing routing information, comprising:
a request receipt module for receiving a request for routing information, the request specifying at least one ambiguous location;
a location lookup module for identifying locations potentially matching the ambiguous location;
an ambiguous location ranking module for ranking the potentially-matching locations based on a metric; and
a reporting module for providing routing information for the highest-ranked potentially-matching location.

17. The computer program product of claim 16, wherein the metric is distance, and wherein the ambiguous location ranking module is further adapted to:
calculate a distance between each location potentially matching the ambiguous location and an other location; and
rank the potentially-matching locations based on the distances from the potentially-matching locations to the other location.

18. The computer program product of claim 17, wherein the highest-ranked potentially-matching location has the shortest distance to the other location.

19. The computer program product of claim 16, wherein the metric is populations of the potentially-matching locations.

20. The computer program product of claim 16, wherein the metric is frequencies that the potentially-matching locations appear in routing requests.

21. The computer program product of claim 16, wherein the ambiguous location ranking module is further adapted to:
generate pairings of locations based on locations specified in the request, each pairing including at least one location potentially matching the ambiguous location;
calculate distances between the locations in the pairs; and
rank the pairings based on the calculated distance.

22. The computer program product of claim 16, wherein the routing information comprises one or more types of information from the set consisting of:
driving directions, train schedules, bus schedules, and flight schedules.

23. A computer-implemented method of providing routing information, comprising:
receiving, by a computer, a request for routing information, the request specifying at least one ambiguous location;
identifying, by a computer, locations potentially matching the ambiguous location;
ranking, by a computer, the potentially-matching locations based on a metric;
selecting, by a computer, a potentially-matching location based on the ranking; and
providing, by a computer, routing information for the selected location.

* * * * *